United States Patent [19]

Vaughan-Jones

[11] 3,872,244

[45] Mar. 18, 1975

[54] TELEVISION SYSTEMS

[75] Inventor: Ian Norman Vaughan-Jones, Wilmslow, England

[73] Assignee: Ferranti Limited, Hollinwood, Lancashire, England

[22] Filed: June 26, 1973

[21] Appl. No.: 373,619

[30] Foreign Application Priority Data

July 6, 1972 United Kingdom............ 31815/72

[52] U.S. Cl................. 178/6.8, 178/DIG. 35, 35/11

[51] Int. Cl............................................... H04n 7/18

[58] Field of Search.......... 178/DIG. 35, 6.8; 35/11, 35/12 N

[56] References Cited

UNITED STATES PATENTS 3,746,778 7/1973 Peters.......................... 178/DIG. 35

*Primary Examiner*—Howard W. Britton

*Attorney, Agent, or Firm*—Cameron, Kerkam, Sutton, Stowell & Stowell

[57] ABSTRACT

A television system includes means for generating a wave-motion pattern for combination with other components of a display. The pattern is gated with the other components of the display, and means are provided for controlling the shape, position and movement of the pattern relative to the rest of the display.

6 Claims, 2 Drawing Figures

TELEVISION SYSTEMS

This invention relates to television systems, and in particular to such systems in which video and electronically generated signals are combined for presentation on a display.

In some types of television system particularly those used in training simulators, there is a requirement for introducing into a television display together with the video signal and superimposed wave pattern representing the sea. Such a wave pattern has to be capable of realistic horizontal and vertical movements and should occupy at least the foreground of the picture. The wave pattern must be capable of obscuring a distant object visible on the display as the motion of the wave pattern occurs.

It is known to represent foreground wave patterns by mechanical means, using shaped plates moved by cams or levers. However, such a representation is not very realistic and it is difficult to represent different sea states.

It is an object of the invention to provide a television system including means for producing a wave pattern which overcomes the above-mentioned disadvantages.

According to the present invention there is provided a television system which includes means for electronically generating a wave-motion pattern, means for gating the signals representing the pattern with video and other signals to ensure correct overlay of the various components of the displayed picture represented by the various signals, and means for controlling the shape and position of the wave-motion pattern relative to the other components of the picture.

The term "overlay" is used to refer to the combination of two or more signals used to form a composite television picture in such a manner that a signal representing an object nearer to an observer of the picture inhibits and replaces any signal representing an object further from the observer where the two objects coincide.

Figure 1:
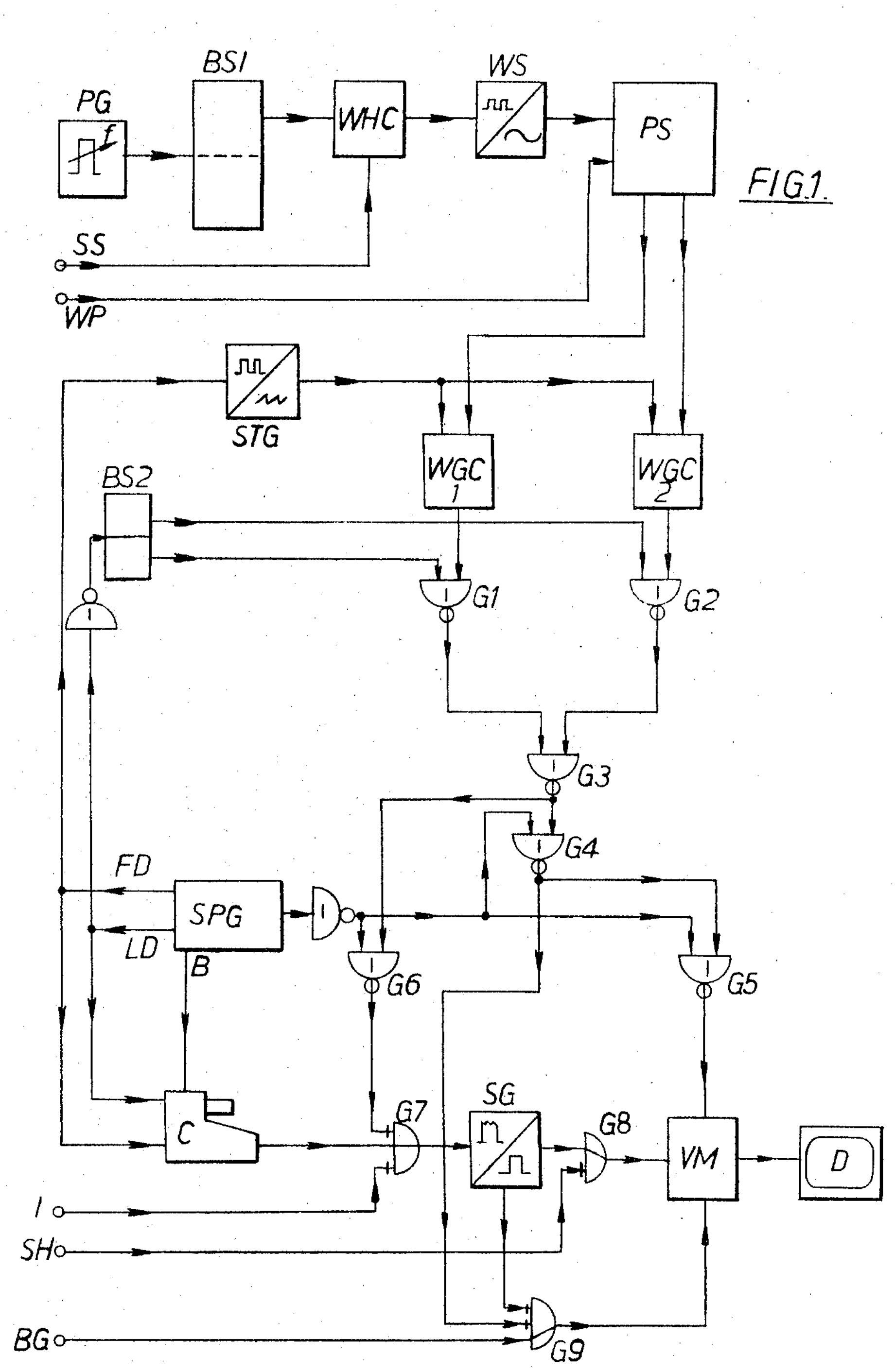
Figure 2:
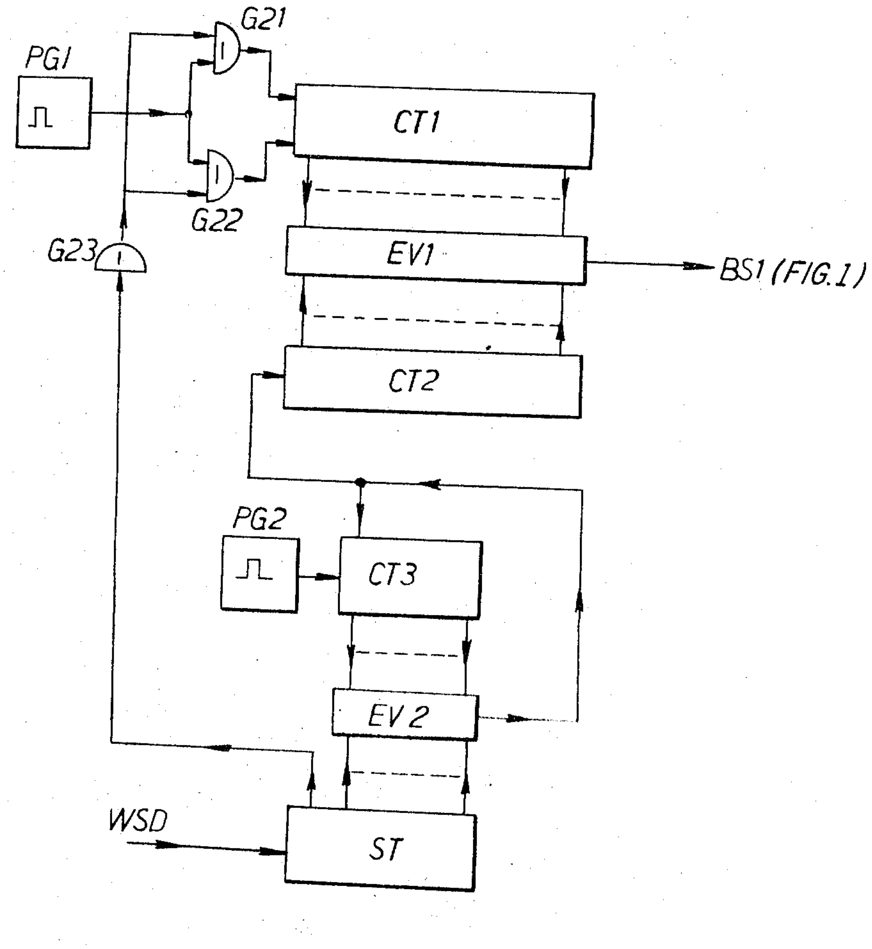

An embodiment of the invention will now be described, by way of example, with reference to the accompanying drawings in which:

FIG. 1 shows a schematic circuit diagram of part of a television system for a training simulator; and FIG. 2 is a block diagram of part of the circuit of FIG. 1.

Referring now to FIG. 1, the television system comprises two distinct parts. One is the normal video chain from camera to display, whilst the other concerns the electronic generation of the wave-motion pattern.

A pulse generator PG generates a train of square-wave pulse at a frequency which may be varied slightly above and below the line drive frequency. These pulses are applied to a bistable device BS1, one output of which is connected to a wave-height control unit WHC. To this unit is also applied a "seastate" signal SS, that is a signal which controls the apparent height of the wave. The output from the wave-height control unit is passed through a waveform-shaping unit WS and forms one input of a phase-splitter PS. The outer input of the phase-splitter is a signal WP which controls the vertical wave position on the display.

The phase-splitter has two outputs, connected to separate wave-generating circuits WGC1 and WGC2. Also applied to each of these circuits is a saw-tooth waveform derived by a saw-tooth generator STG from the frame drive pulses of the television system's sync pulse generator SPG. Each wave-generating circuit consists of a transistor switch which changes state whenever the relative polarity of the two inputs becomes reversed. The output pulses of the wave-generating circuits are applied to separate two-input NOR gates G1 and G2. The other inputs are derived from the line drive pulses generated by the sync pulse generator by means of a bistable device BS2. One output of the bistable device is connected to one of the two gates, whilst the other output from the bistable device is connected to the other gate. The outputs from the two gates G1 and G2 are applied to the two inputs of NOR gate G3. The output of G3 forms one input of NOR gate G4, the other input being inverted frame and line blanking pulses from the sync pulse generator (referred to hereafter as "mixed" blanking pulses). The output of gate G4 performs several functions. Together with the inverted mixed blanking pulses the output of G4 is applied to NOR gate G5 the output of which is the wave-motion pattern applied to video mixer VM. The output of G3 and the inverted mixed blanking pulses are also applied to NOR gate G6 which provides a controlling signal for the video system.

The television system comprises a camera C provided with line and frame drive pulses LD and FD and blanking pulses B from the sync pulse generator SPG. The camera video output passes to a linear gate G7 to which are applied two inhibiting inputs. One of these is the output of NOR gate G6, whilst the other is provided by various inhibit inputs I. The output of G7 passes to a silhouette generator SG which produced an output defining the "envelope" of the video signal from the camera. This output is applied to a linear gate G8 having an inhibit input to which are applied silhouette signals SH from other cameras in the simulator. The output of G8 is applied to the video mixer M to represent the camera video signals.

An input representing the "background" of the required composite picture is provided by signals BG which are applied to a linear gate G9. Applied to this gate as inhibit inputs are the output of gate G4 and the output of the silhouette generator SH. The output of G9 is applied to the video mixer VM. The output of the video mixer is connected to the display D, to which will also be applied the usual sync pulses (not shown).

In operation, the pulse generator PG produces a squarewave output at a frequency slightly different from the line drive frequency. This frequency is halved by the bistable device BS1, since it has been found that a wave-pattern based on a half-line-drive frequency is more realistic than one at line drive frequency. The wave-height control WHC is a circuit in which the amplitude of the square-wave is varied in accordance with the magnitude of the SS input. The wave shaping circuit WS thus produced a sine-wave output of variable amplitude at a frequency close to half the line drive frequency. This is split into two paraphase components by the phase splitter PS, the two components having identical bias derived from the input WP and being applied to the separate wave-generating circuits WGC1 and WGC2. The magnitude of WP, and hence of this bias, determines the vertical position of the waves on the display.

Each wave-generating circuit is of a type which produces an output appearing on a display screen as a light area above a dark area, the boundary between the two being generally sinusoidal. If the sinewave frequency is not quite the same as, or is a submultiple of, the line drive frequency then the sinusoidal boundary will drift slowly sideways. The use of half line-drive frequency sinewave control results in positive and negative half-cycles of the boundary being on alternate lines of the resulting display.

The inverted line drive pulses are used to step bistable device BS2, which produces two square-wave outputs in antiphase at half line drive frequency. Gates G1 and G2 hence each function to present the same half of the sinewave output from their respective wave generating circuit each time, the two half sinewaves being combined by gate G3.

Gate G4 is used to suppress the wave-pattern output during the line and frame blanking periods. The output of G4 is inverted by G5 and forms the wave-pattern signals to the video mixer.

The output of gate G5 is the G3 output suppressed during the blanking periods, and is used to inhibit the video signals from the camera during the periods when the electrically generated wave-pattern is required to obscure the object, say a ship, viewed by the camera. Arrangements may also be provided for inhibiting the video signals by other inputs I as shown.

The video signals which pass through linear gate G7 are applied to the silhouette generator. This passes the video signals to gate G8 and at the same time generates an "envelope" of the ship to be applied to gate G9. At gate G8 the video signals are inhibited by the "envelope" signals from other video chains so that the video signals representing the ship and wave-pattern may be inhibited by another ship which is required to appear in front of the one seen by camera C. Gate G9 receives the background signals BG representing the sea/sky background, and this may be inhibited by the "envelope" signals from the silhouette generator or by the wave-pattern signals from gate G4. The output of gate G9 is applied to the video mixer VM so that the picture on the display D shows the sea/sky background. In the absence of other inputs to the video mixer the inhibiting effect of the input from the silhouette generator SG produces a black silhouette of the ship viewed by camera C, provided gate G7 is not inhibited. In addition, the inhibiting effect of the input from gate G4 produces a silhouette of the wave, so that the whole picture below the sinusoidal wave crest is black. The addition of the output from gate G8 to the video mixer fills in the ship silhouette with a half-tone representation of the ship. Similarly the addition of the output from GS to the video mixer produces a grey tone over the whole area of the wave in suitable contrast to the background. The vertical position of the waves may be adjusted by the "wave-position" signal WP, whilst the wave-height may be adjusted by means of the "sea-state" signal SS. The waves may be caused to move to left or right with varying speed by adjustment of the frequency of the pulse generator PG. When inhibited the outputs of the linear gates G7, G8 and G9 are held at television black level.

FIG. 2 illustrates one way in which wave movement control may be effected using digital techniques. The circuitry shown replaces the pulse generator PG of FIG. 1.

Referring now to FIG. 2, the pulse source is a high-speed oscillator PG1 running at a fixed pulse repetition rate of, say, 16 MHz. The output from the oscillator is fed through gates G21 and G22 to the "up" and "down" inputs of a reversible 10-stage counter CT1. The outputs from the various stages of the counter are applied to an equivalence network EV1. Also applied to the equivalence network are the stage outputs of a unidirectional 10-stage counter CT2. The stepping input of counter CT2 is derived from the output of a second equivalence network EV2.

A 5-stage unidirectional counter CT3 is clocked at a low speed, say 512 Hz, by a pulse generator PG2, and the stage outputs of the counter are applied to the second equivalence network EV2. The other inputs to network EV2 are derived from a 6-bit shift register ST to which is applied a signal WSD, being a digital data denoting wave speed and direction. The first bit of the shift register represents the direction of movement of the wave and is used to control gates G21 and G22 via an inverting gate G23. The remaining five bits of the shift register represent the wave speed. The output of equivalence network EV2 is used to reset counter CT3.

In operation, counter CT1 counts at a fixed rate in a direction determined by the first bit of the wave speed and direction signal WSD. A complete counting cycle occurs at 15,625 Hz, which is the television line frequency for 625-line pictures.

Counter CT3 counts slowly until the count stored is equivalent to the setting of the shift register ST at which point the output from equivalence network EV2 applies a stepping pulse to counter CT2 and resets counter CT3. This continues until counter CT2 contains the same count as counter CT1. Such equivalence results in a pulse being produced from equivalence network EV1 which is applied to the bistable device BS1 of FIG. 1.

Wave speed and direction is simply controlled by varying the contents of the shift register, and may easily be arranged to take account, for example, of the variation of wave speed and direction resulting from changes in the direction in which the observer is "looking."

It will be appreciated that the system described above for generating the wave-pattern will normally be associated with a number of video chains each representing, say, a different ship. Hence the SH signals applied to gate G8 will come from some or all of the other video chains, depending upon the relative "range" of each ship, and the output from the silhouette generator will similarly be applied to the other video chains.

Other variations may be provided by using more complex circuitry, and the effects may be controlled by a computer usually associated with a training simulator.

What we claim is:

1. A television system which includes means for electronically generating a wave-motion pattern including a variable-frequency oscillator operable at a frequency approximately equal to or the same as the television system line frequency, the variable-frequency oscillator including a high-speed bidirectional counter driven by a clock pulse generator and having its output compared with that of a variable-speed counter to generate a square-wave output from which the wave-motion pattern is derived, means for gating the signals representing the pattern with video and other signals to ensure correct overlay of the various components of a displayed picture represented by the various signals, and means for controlling the shape and position of the wave-motion pattern relative to the other components of the picture.

2. A system as claimed in claim 1 in which the variable-speed counter is driven by the output of an equivalence circuit to which are applied the outputs of a low-speed counter and a controllable shift register the contents of which control the speed of movement of the wave-motion pattern.

3. A system as claimed in claim 2 in which the shift register controls the direction of count of the bi-directional counter and hence the direction of movement of the wave-motion pattern.

4. A system as claimed in claim 1 in which the generating means includes circuit means operable to derive from the output of the variable-frequency oscillator two paraphase sine wave outputs at a frequency approximately equal to or the same as half the television system line frequency.

5. A system as claimed in claim 4 in which the gating means includes means synchronised with the television system line frequency to pass to the display alternate ones of the said sine wave outputs on alternate scan lines.

6. A system as claimed in claim 4 in which the shape of the wave-motion pattern is controlled by varying the amplitude of the two sine-wave outputs.

* * * * *